March 22, 1949.   H. V. HYATT   2,464,979
CARRIER ATTACHMENT FOR AUTOMOBILES
Filed April 29, 1946
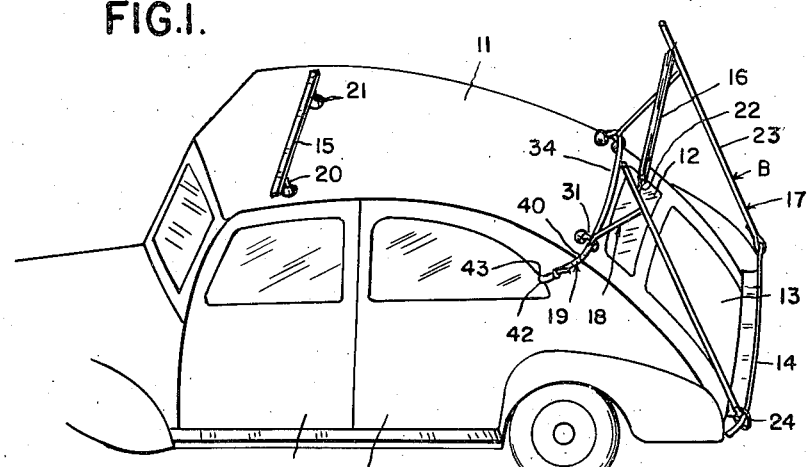
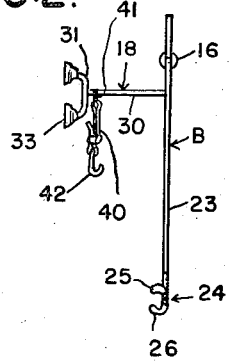
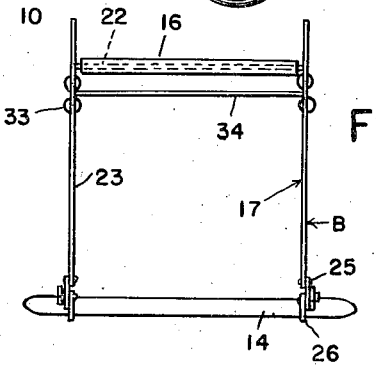
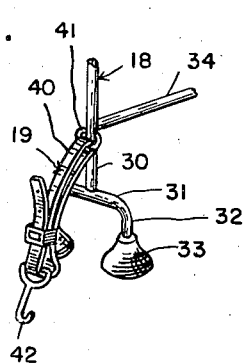
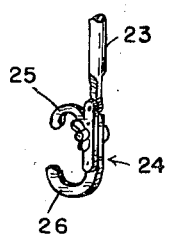
*INVENTOR.*
HOWARD V. HYATT
BY
*Whittemore, Hulbert & Belknap*
ATTORNEYS Patented Mar. 22, 1949

2,464,979

UNITED STATES PATENT OFFICE 2,464,979

CARRIER ATTACHMENT FOR AUTOMOBILES

Howard V. Hyatt, Detroit, Mich.

Application April 29, 1946, Serial No. 665,669

6 Claims. (Cl. 224—42.03)

1

This invention relates generally to a device designed for quick attachment to and removal from an automobile or other closed vehicle and is adapted to serve as a carrier upon the top of such vehicle for a boat, set of ladders, pile of lumber, or other cumbersome load.

One of the essential objects of the invention is to provide a one man carrier attachment of the type mentioned, i. e., a carrier that may be attached and loaded by one man.

Another object is to provide a carrier that may be attached to coupes as well as sedans and may be loaded from the rear, side or front of the vehicle, as desired.

Another object is to provide a carrier that may be attached with equal facility to the modern ultra-streamlined vehicles as well as to the more upright top portions of older types of motor vehicles.

Another object is to provide a carrier that provides a clear unobstructed view through the rear window of the vehicle, even when the carrier is loaded, and enables the rear deck lid or trunk cover to be opened and closed without interference with any part of the carrier or the load thereon.

Another object is to provide a carrier that is simple in construction, economical to manufacture, easy to attach to or detach from a vehicle, and efficient and safe in operation.

Another object is to provide a carrier that will not harm the finish of the vehicle to which it is attached.

Another object is to provide a carrier that has anti-rocking properties and offers a positive means for preventing load side sway.

Another object is to provide a carrier attachment wherein a part of the downward pressure of the load is transferred to a bumper of the vehicle, hence the roof or top of the vehicle above which the load is carried is relieved of this portion of the burden.

Another object is to provide a carrier having means, preferably in the form of a rotatable element, for facilitating the loading of the carrier.

Other objects, advantages and novel details of construction of this invention will be made more apparent as this description proceeds, especially when considered in connection with the accompanying drawing, wherein:

Figure 1 is a fragmentary perspective view of an automobile equipped with a carrier embodying my invention;

Figure 2 is a side elevation of a portion of the carrier when not attached to the vehicle;

2

Figure 3 is a rear view of the carrier and showing the clamps applied to the rear bumper;

Figure 4 is a fragmentary perspective view of the carrier structure; and

Figure 5 is another fragmentary perspective view of the carrier structure.

Referring now to the drawing A is an automobile of the sedan type having a body 10 provided with a roof or top 11, rear window 12, rear deck lid or cover 13, and a rear bumper 14, and B is a carrier embodying my invention attached to said automobile.

As shown, the carrier B has two cross pieces 15 and 16 respectively at longitudinally spaced points of the automobile top 11, a forwardly inclined substantially H-shaped frame 17, a rearwardly inclined substantially H-shaped brace 18 for said frame, and hold downs 19 for said brace 18.

The front cross piece 15 is spaced slightly above the top 11 of the automobile and has depending legs 20 attached to said top 11. Said front cross piece 15 may be any suitable construction and may be formed of any suitable material. Preferably said front cross piece 15 is formed from a piece of metal tubing or pipe or bar of sufficient strength to carry the load, and the legs 20 are rigid with said cross piece 15 and are attached by suction cups 21 to the automobile top 11. Preferably the suction cups 21 are formed of soft enough material to prevent damage to the finish of the automobile top and are applied thereto adjacent opposite side edges thereof so as to be over the side frame members (not shown) of the automobile top for proper load carrying purposes. If desired said legs 20 may be attached by any other suitable means to said top 11 to hold the cross piece 15 in proper position for supporting the load.

The rear cross piece 16 is a roller mounted to turn or rotate upon the cross bar 22 of the H-shaped frame 17. Such roller 16 is preferably parallel to the front cross piece 15, and may be formed from any suitable material.

The H-shaped frame 17 is supported upon and detachably connected to the rear bumper 14 of the automobile and is held in proper inclined position relative to the automobile body 10 by means of the H-shaped brace 18. Preferably the uprights 23 of the H-shaped frame 17 are provided at their lower ends with substantially C-shaped clamps 24 having relatively adjustable jaws 25 and 26 respectively that detachably grip the rear bumper 14 of the automobile. Said clamps 24 may be of any suitable construction and may be connected in any suitable manner to the uprights 23.

To prevent side slip of the load relative to the top 11 of the automobile, the uprights 23 extend upwardly at 24 a sufficient distance above the cross bar 22 and roller 16 thereon to be engaged by and form abutments for the load on said roller 16. Said uprights 23 and cross bar 22 may be any suitable construction, as desired.

The H-shaped brace 18 is connected to and projects forwardly from the uprights 23 of the H-shaped frame 17 and is detachably connected to the top 11 of the automobile. Preferably the legs 30 of said brace are rigid with and project at susbtantially right angles from the uprights 23 at points just below the cross bar 22 upon which the roller 16 is mounted, and have bifurcated or forked lower end portions 31, upon the furcations 32 of which are mounted suction cups 33 by which said legs 30 are detachably connected to the top 11 of the automobile. In the present instance the suction cups 33 are formed of soft enough material to prevent damage to the finish of the automobile top and are applied thereto adjacent opposite side edges thereof so as to be over the side frame members (not shown) of the automobile top 11 for proper load carrying purposes. The cross bar 34 of said H-shaped brace 18 is rigid with and serves as a tie bar between the legs 30 near the bifurcated end portions 31 thereof and preferably is curved so as to follow the contour of the top 11 of the automobile.

The hold downs 19 for the H-shaped brace 18 are terminally connected to the brace 18 and body 10 of the automobile and serve to hold the suction cups 33 against displacement relative to the top 11 of the automobile and otherwise prevent slippage or accidental movement of the brace 18 relative to the automobile. Preferably each hold down 19 has an adjustable strap 40 connected at one end to an eye 41 on a leg 30 of the brace and provided at the other end with a hook 42 designed to catch on some convenient portion 43 of the body 10 of the automobile. For example, each hook 42 may be hooked on the eave trough or rear quarter window frame of the vehicle body, as desired.

In use, the front cross piece 15 may be left upon the top 11 of the automobile once it is applied or may be applied by means of the suction cups 21 to said top each time the carrier is to be used, as desired. The rest of the carrier structure is preferably removed from the automobile after each time it is used but may be left thereon if desired. From the foregoing description it is apparent that the H-shaped frame 17 may be easily and quickly connected by means of the clamps 24 to the rear bumper 14 of the automobile to position the rear cross piece 16 in substantially parallel relation to the front cross piece 15; the H-shaped brace 18 may be readily attached by means of the suction cups 33 to the top 11 of the automobile to maintain said parallel relation; and the attachment of said suction cups 33 to the top 11 may be maintained by the hold downs 19 which in turn may be readily hooked to any suitable part of the body 10 of the automobile. A load (not shown) such as a boat, set of ladders, pile of lumber or other cumbersome object may be readily placed onto the carrier by first leaning or placing the load against the roller 16, and then pushing said load forwardly over the roller 16 onto the front cross piece 15. Such load is then resting upon both cross pieces 15 and 16 and is held by the upward extensions 24 of the uprights 23 from slipping sideways. Any suitable means (not shown) may be used to tie the load to either or both the cross pieces 15 and 16 as desired. Inasmuch as the legs 30 of the H-shaped brace 18 are attached to the automobile at opposite side edges thereof, and the cross bar 22 carrying the roller 16 is above said legs 30, the driver of the automobile will have clear unobstructed vision through the rear window 12 of the automobile at all times even when the carrier is loaded. Also the location of the uprights 23 of the H-shaped frame is such relative to the rear deck lid 13 or trunk cover of the automobile that said lid or cover may be opened or closed by the said uprights 23 without interference with any part of the carrier or load thereon.

What I claim as my invention is:

1. A device for carrying a load on top of a body of a motor vehicle equipped with a bumper, comprising cross pieces upon which the load may rest, and a support for one of said cross pieces including two substantially H-shaped members, one carrying said one cross piece and having means for attachment to said bumper, and the other constituting a brace for said one member and having means for attachment to said body.

2. A device for carrying a load on top of a body of a motor vehicle equipped with a bumper, comprising cross pieces upon which the load may rest, and a support for one of said cross pieces including two substantially H-shaped members, said one cross piece being a roller on the cross bar of one of said H-shaped members, said one H-shaped member being attachable to said bumper, and the other of said H-shaped members projecting at substantially right angles from said one member and having means for attachment to said body.

3. A device for carrying a load above and substantially parallel to the top of an automobile equipped with a rear bumper, comprising a substantially H-shaped frame, a substantially H-shaped brace for said frame, and load carrying cross pieces adapted to be located at longitudinally spaced points of said top, one of said cross pieces being sleeved upon and rotatable about the cross bar of said H-shaped frame, the other of said cross pieces being attachable to said top, the legs of said H-shaped frame being attachable to said bumper and projecting above said rotatable cross piece to prevent side slip of the load upon said rotatable cross piece, the legs of said H-shaped brace projecting from the legs of said H-shaped frame and being attachable to said top, and hold-downs for said brace projecting from the legs thereof and attachable to portions of said automobile at opposite sides thereof.

4. A device for carrying a load above and substantially parallel to the top of an automobile, comprising a substantially H-shaped frame, a substantially H-shaped brace rigid with said frame, and load carrying cross pieces adapted to be located at longitudinally spaced points of said top, one of said cross pieces being sleeved upon and rotatable about the cross bar of said H-shaped frame, the other of said cross pieces being attachable to said top, the legs of said H-shaped frame being attachable to a part of said automobile at the rear thereof and projecting above said rotatable cross piece to prevent side slip of the load upon said rotatable cross piece, the legs of said H-shaped brace projecting from the legs of said H-shaped frame and being attachable to said top, and hold-downs for said brace projecting from the legs thereof and attachable to portions of said automobile at opposite sides thereof.

5. A device for carrying a load above and substantially parallel to the top of an automobile, comprising a substantially H-shaped frame, a substantially H-shaped brace rigid with said frame, and load carrying cross pieces adapted to be located at longitudinally spaced points of said top, one of said cross pieces being sleeved upon and rotatable about the cross bar of said H-shaped frame, the other of said cross pieces having depending legs attachable to said top, the legs of said H-shaped frame being attachable to a part of said automobile at the rear thereof, the legs of said H-shaped brace projecting from the legs of said H-shaped frame and being attachable to said top.

6. A device for carrying a load above and substantially parallel to the top of an automobile, comprising a substantially H-shaped frame, a substantially H-shaped brace for said frame, and a pair of separately removable load carrying cross pieces adapted to be located at longitudinally spaced points of said top, one of said cross pieces being sleeved upon and rotatable about the cross bar of said H-shaped frame, the other of said cross pieces being attachable to said top, the legs of said H-shaped frame being attachable to a part of said automobile at the rear thereof, the legs of said H-shaped brace projecting from the legs of said H-shaped frame and having forked end portions attachable to said top.

HOWARD V. HYATT.

REFERENCES CITED

The following references are of record in the file of this patent:

UNITED STATES PATENTS

| Number | Name | Date |
| --- | --- | --- |
| 2,171,053 | White et al. | Aug. 29, 1939 |
| 2,247,128 | Levey | June 24, 1941 |
| 2,325,762 | Ford | Aug. 3, 1943 |
| 2,338,955 | Metcalf | Jan. 11, 1944 |
| 2,357,203 | Jimmes | Aug. 29, 1944 |
| 2,361,592 | Bjork | Oct. 31, 1944 |
| 2,409,103 | Cameron | Oct. 8, 1946 |

FOREIGN PATENTS

| Number | Country | Date |
| --- | --- | --- |
| 61,913 | Norway | Apr. 17, 1939 |
| 844,348 | France | Jan. 15, 1940 |